(12) United States Patent
Noonan et al.

(10) Patent No.: US 9,828,884 B2
(45) Date of Patent: Nov. 28, 2017

(54) SYSTEM AND METHOD FOR PREHEATING A HEAT RECOVERY STEAM GENERATOR

(71) Applicant: GENERAL ELECTRIC TECHNOLOGY GMBH, Baden (CH)

(72) Inventors: Remo Richard Noonan, Wallingford, CT (US); Wesley Paul Bauver, II, Granville, MA (US)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 99 days.

(21) Appl. No.: 15/053,344

(22) Filed: Feb. 25, 2016

(65) Prior Publication Data

US 2017/0248037 A1    Aug. 31, 2017

(51) Int. Cl.
| | |
|---|---|
| *F01K 23/10* | (2006.01) |
| *F01K 13/02* | (2006.01) |
| *F02C 6/18* | (2006.01) |
| *F22B 1/18* | (2006.01) |
| *F01K 3/14* | (2006.01) |
| *F02G 5/02* | (2006.01) |
| *F28D 21/00* | (2006.01) |

(52) U.S. Cl.
CPC ............ *F01K 13/02* (2013.01); *F01K 23/101* (2013.01); *F02C 6/18* (2013.01); *F22B 1/1815* (2013.01); *F01K 3/14* (2013.01); *F02G 5/02* (2013.01); *F02G 2254/15* (2013.01); *F28D 21/0003* (2013.01); *Y02E 20/16* (2013.01)

(58) Field of Classification Search
CPC .......... F01K 3/14; F01K 13/02; F01K 17/025; F01K 17/06; F01K 23/10; F01K 23/101; F02G 5/02; F02G 2254/15; F22B 1/1807; F22B 1/1815; F22B 1/1884; F28D 21/0003; Y02E 20/16
USPC .......... 60/616, 618, 646, 653, 657, 661, 664, 60/666; 165/280, 297, DIG. 111
See application file for complete search history.

(56) References Cited

U.S. PATENT DOCUMENTS

| | | | | |
|---|---|---|---|---|
| 5,365,730 | A * | 11/1994 | Bruckner | F01K 23/103 122/7 B |
| 6,244,035 | B1 * | 6/2001 | Krill | F01K 23/10 60/39.182 |
| 6,340,002 | B1 | 1/2002 | Liebig | |
| 2008/0115922 | A1 * | 5/2008 | Horek | F28D 9/00 165/240 |
| 2010/0043442 | A1 * | 2/2010 | Zhang | F01K 23/10 60/772 |
| 2012/0317973 | A1 * | 12/2012 | Gulen | F01K 23/101 60/597 |

(Continued)

FOREIGN PATENT DOCUMENTS

| | | |
|---|---|---|
| WO | 2013108217 A2 | 7/2013 |
| WO | 2015165668 A1 | 11/2015 |

*Primary Examiner* — Jorge Leon, Jr.
(74) *Attorney, Agent, or Firm* — GE Global Patent Operation; Stephen G. Midgley

(57) ABSTRACT

A system for preheating a heat recovery steam generator is provided. The system includes a tank and a heat exchanger. The tank contains a transferring medium. The heat exchanger is disposed in a flow path of a flue gas produced by a combustion chamber, and is fluidly connected to the tank such that the transferring medium flows through the heat exchanger and is heated by the flue gas. The transferring medium preheats one or more components of the heat recovery steam generator.

22 Claims, 3 Drawing Sheets

(56) References Cited

U.S. PATENT DOCUMENTS

2015/0047366 A1    2/2015   Carroni et al.

* cited by examiner

SYSTEM AND METHOD FOR PREHEATING A HEAT RECOVERY STEAM GENERATOR

BACKGROUND

Technical Field

Embodiments of the invention relate generally to power generation and, more specifically, to a system and method for preheating a heat recovery steam generator.

Discussion of Art

Heat recovery steam generators ("HRSGs") are devices that recover thermal energy from heat-containing mediums such as flue gas produced via combustion of a fuel, or any other gas and/or plasma that contains recoverable thermal energy. Many HRSGs recover heat from a heat-containing medium by exposing one or more components, typically pressurized/pressure parts such as an evaporator and/or a superheater, to the heat-containing medium. In such HRSGs, the evaporator generates steam by absorbing/recovering some of the thermal energy from the heat-containing medium. The superheater then dries the generated steam by absorbing/recovering more of the thermal energy from the heat-containing medium. The dried steam is then typically distributed to a steam-consuming device, e.g., a steam powered turbine for generating electrical power.

Many power plants, known as combined cycle power generation plants, often use HRSGs to recover thermal energy from a flue gas produced by a primary generator. The recovered thermal energy is then used to power a turbine which in turn powers a secondary generator. Such combined cycle power generation plants typically have two modes of operation, simple-cycle and combined-cycle. During simple-cycle mode, the HRSG is "offline" and not generating steam, and the flue gas produced by the primary generator is typically diverted around the HRSG via a bypass stack such that the pressurized parts are not exposed to the flue gas. During combined-cycle mode, the HRSG is "online," i.e., the flue gas is directed into the HRSG to generate steam, and the pressurized parts are exposed to the flue gas.

In such power plants, however, it is often the case that pressurized parts of the HRSG, and in particular the evaporator and the superheater, experience thermal stresses during transition from simple-cycle mode to combined-cycle mode due to temperature differences between the pressurized parts and the flue gas. Such thermal stresses often degrade the service lives of the pressurized parts, especially pressurized parts having thick walls. The thermal stresses experienced by the pressurized parts are often greatest during the transition of a combined cycle power generation plant from simple-cycle mode to combined-cycle mode and, in particular, when the HRSG has been offline for an extended period of time and the pressurized parts have cooled to ambient temperature.

Therefore, in order to reduce thermal stresses during transition from simple-cycle mode to combined-cycle mode, some combined cycle power generation plants temper the pressurized parts by gradually introducing the flue gas into the HRSG. Gradually introducing the flue gas into the HRSG, however, delays such combined cycle power generation plants in reaching full operational capacity. Moreover, the introduced flue gas typically has a temperature well above the pressurized parts, thus gradually introducing the flue gas into the HRSG may still induce thermal stress in the pressurized parts.

In view of the above, what is needed is a system and method for preheating a heat recovery steam generator.

BRIEF DESCRIPTION

In an embodiment, a system for preheating a heat recovery steam generator is provided. The system includes a tank and a heat exchanger. The tank contains a transferring medium. The heat exchanger is disposed in a flow path of a flue gas produced by a combustion chamber, and is fluidly connected to the tank such that the transferring medium flows through the heat exchanger and is heated by the flue gas. The transferring medium preheats one or more components of the heat recovery steam generator.

In another embodiment, a method for preheating a heat recovery steam generator is provided. The method includes containing a transferring medium in a tank disposed in the heat recovery steam generator. The method further includes heating the transferring medium via a heat exchanger disposed in a flow path of a flue gas produced by a combustion chamber, the heat exchanger fluidly connected to the tank such that the transferring medium flows through the heat exchanger. The method further includes preheating one or more components of the heat recovery steam generator via the transferring medium.

In yet another embodiment, a system for preheating a heat recovery steam generator of a combined cycle power generation plant is provided. The system includes an evaporator drum and a heat exchanger. The evaporator drum is disposed in the heat recovery steam generator and contains drum water. The heat recovery steam generator is configured to recover thermal energy from a flue gas produced by a primary generator of the combined cycle power generation plant when the combined cycle power generation plant is in a combined-cycle mode. The heat exchanger is disposed in a bypass stack of the combined cycle power generation plant and fluidly connected to the evaporator drum. When the combined cycle power generation plant is in a simple-cycle mode, the drum water flows through the heat exchanger, the bypass stack allows the flue gas to bypass the heat recovery steam generator and heat the drum water flowing through the heat exchanger, and one or more pressure parts of the heat recovery steam generator are preheated via the drum water before the one or more pressure parts are exposed to the flue gas when the combined cycle power generation plant is in the combined-cycle mode.

DRAWINGS

The present invention will be better understood from reading the following description of non-limiting embodiments, with reference to the attached drawings, wherein below:

DETAILED DESCRIPTION

Figure 1:
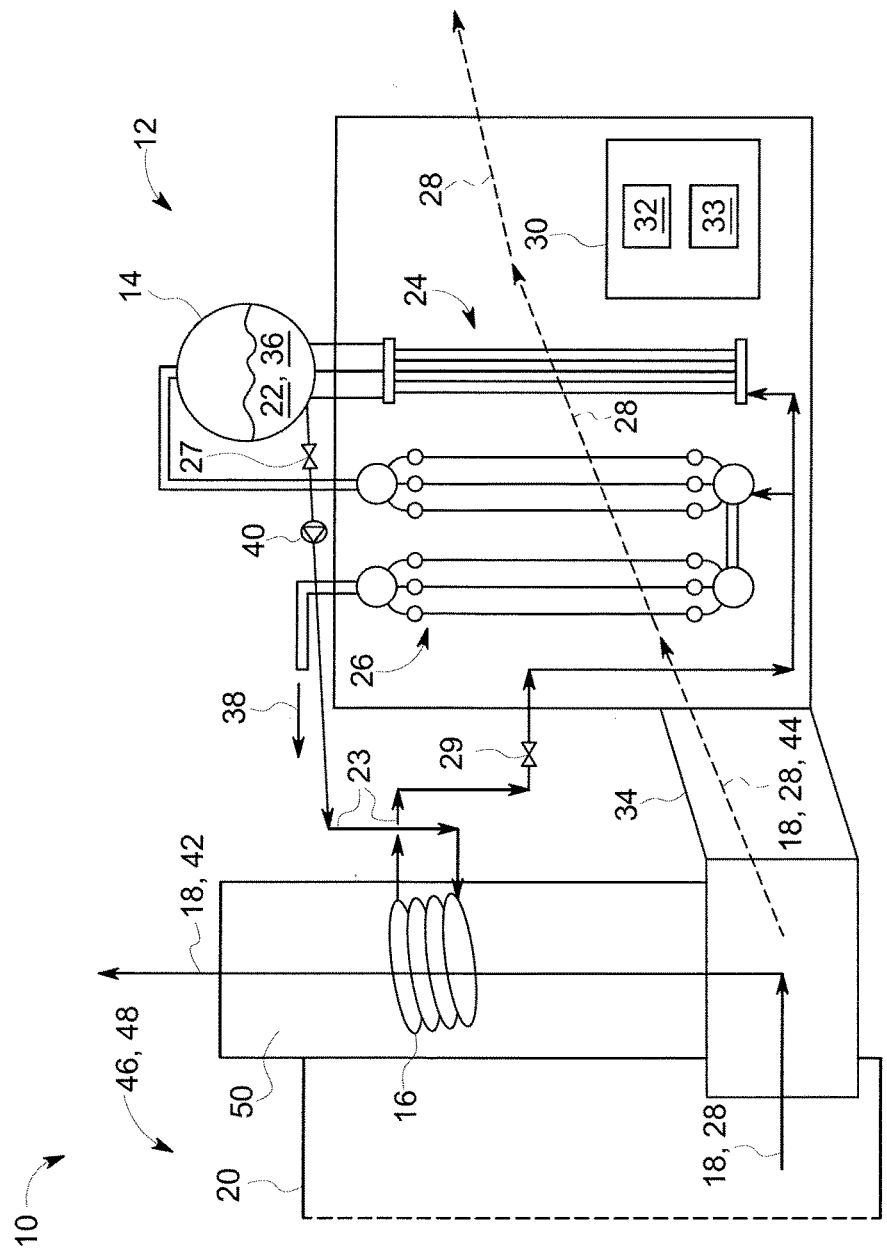
FIG. 1 is a diagram of a system for preheating a heat recovery steam generator in accordance with an embodiment of the invention.

Reference will be made below in detail to exemplary embodiments of the invention, examples of which are illustrated in the accompanying drawings. Wherever possible, the same reference characters used throughout the drawings refer to the same or like parts, without duplicative description.

As used herein, the terms "substantially," "generally," and "about" indicate conditions within reasonably achievable manufacturing and assembly tolerances, relative to ideal desired conditions suitable for achieving the functional purpose of a component or assembly. As used herein, "electrically coupled," "electrically connected," and "electrical communication" mean that the referenced elements are directly or indirectly connected such that an electrical current may flow from one to the other. The connection may include a direct conductive connection, i.e., without an intervening capacitive, inductive or active element, an inductive connection, a capacitive connection, and/or any other suitable electrical connection. Intervening components may be present. As also used herein, the term "fluidly connected" means that the referenced elements are connected such that a fluid (to include a liquid, gas, and/or plasma) may flow from one to the other. Accordingly, the terms "upstream" and "down stream," as used herein, describe the position of the referenced elements with respect to a flow path of a fluid flowing between and/or near the referenced elements. As further used herein, the term "preheat" means the heating of one or more components of an HRSG before the one or more components are exposed to a sustained operating load of a heat-containing medium, i.e., before the HRSG is generating steam in accordance with normal operations. Additionally, as used herein, the term "fill" includes both fully and partially filling a containing object with a filling object.

Further, while the embodiments disclosed herein are described with respect to heat recovery steam generators, it is to be understood that embodiments of the present invention are equally applicable to any device and/or process in which one or more components are at risk of damage due to thermal stresses induced by exposure of the components to a heat-containing medium. A such, it is further to be understood, that while many of the embodiments disclosed herein describe heat recovery steam generators in the context of combined cycle power generation plants, embodiments of the invention are also equally applicable to heat recovery generators (which may or may not involve steam) in applications other than combined cycle power generation plants.

Accordingly, referring to FIG. 1, a system 10 for preheating a heat recovery steam generator 12 includes a tank 14, and a heat exchanger 16 disposed in a flow path of a flue gas 18 produced by a combustion chamber 20. The tank 14 contains a transferring medium 22, and the heat exchanger 16 is fluidly connected to the tank 14, via one or more conduits 23, such that the transferring medium 22 flows through the heat exchanger 16 and is heated by the flue gas 18. The transferring medium 22 heats one or more components 14, 24, 26 of the HRSG 12 before the one or more components 14, 24, 26 are exposed to a heat-containing medium 28, from which the HRSG 12 recovers thermal energy. In embodiments, the flue gas 18 may be the heat-containing medium 28.

Heating the one or more components 14, 24, 26, via the transferring medium 22, tempers the one or more components 14, 24, 26 such that the amount and/or magnitude of thermal stress induced in the one or more components 14, 24, 26 by exposure to the heat-containing medium 28 is reduced. As used herein, tempering the components 14, 24, 26 means that the temperatures of the components 14, 24, 26 are brought within a certain amount/range/thermal distance of the temperature of the heat-containing medium 28 prior to exposure of the components 14, 24, 26 to the heat-containing medium 28. In embodiments, the system 10 may further include a controller 30 having at least one processor/CPU 32 and a memory device 33 that stores a preheating program/application. The controller 30 may be disposed in the HRSG 12 and/or otherwise located such that the controller 30 is in communication with the various components of the system 10. In embodiments, the heat exchanger 16 may be fluidly connected and/or isolated from the tank 14 via one or more valves 27, 29.

The one or more components 14, 24, 26 may include the tank 14, an evaporator 24, and a superheater 26. In embodiments, the one or more components 14, 24, 26 may be/include one or more pressurized/pressure parts 14, 24, 26. As used herein, the terms "pressure part" and "pressurized part" mean any component of the HRSG 12, or similar device, which contains a pressurized medium, e.g., steam, flue gas, and/or other pressurized mediums, to include the transferring medium 22 and/or the heat-containing medium 28. The pressurized parts 14, 24, 26 may have thick walls.

In embodiments, the evaporator 24 and the superheater 26 may be pressurized parts. For example, in such embodiments, the heat-containing medium 28 may be forced through a duct 34 of the HRSG 12 such that the evaporator 24 and the superheater 26 come into heating-contact with the heat-containing medium 28, e.g., the one or more components 24, 26 are exposed to the heat-containing medium 28. As used herein, the term "heating-contact" means that the referenced objects are in proximity of one another such that heat/thermal energy can transfer between them. When in heating-contact with the heat-containing medium 28, the evaporator 24 converts a working-medium 36, which is typically contained within the evaporator 24, into a gas/steam by absorbing thermal energy from the heat-containing medium 28. As shown in FIG. 1, in embodiments, the transferring medium 22, used to heat the one or more components 14, 24, 26 prior to the components 14, 24, 26 being exposed to the heat-containing medium 28, and the working-medium 36, may be one in the same. However, it is to be understood that in other embodiments, the transferring medium 22 may be separate from the working-medium 36.

Once converted into a gas by the evaporator 24, the working-medium 36 is then sent to the superheater 26 which "dries" the working-medium 36 gas/steam by absorbing more thermal energy from the heat-containing medium 28. As shown by arrow 38, once dried, the working-medium 36 is sent to a heat consuming device and/or process, e.g., a steam turbine generator.

The tank 14 may be an evaporator drum disposed in/on and/or incorporated into the evaporator 24. The heat exchanger 16 is configured to be in heating contact with the flue gas 18 such that the heat exchanger 16 heats the transferring medium 22 by absorbing thermal energy from the flue gas 18. In embodiments, the heat exchanger 16 may be relatively small in size. For example, in embodiments, the heat exchanger 16 may be a coil. In embodiments, the transferring medium 22 may flow between the tank 14 and the heat exchanger 16 via natural convection. In other embodiments, one or more pumps 40 may be used to circulate, via forced convection, the transferring medium 22 between the tank 14 and the heat exchanger 16. Additionally, other forms of convection, such as gravitational convection, may be used to circulate the transferring medium 22 between the tank 14 and the heat exchanger 16.

The flue gas 18 flows along a path, e.g., flow path 42, that runs from the combustion chamber 20 through the heat exchanger 16, and may be formed by one or more conduits, pipes, and/or other devices capable of directing the flow of the flue gas 18. In embodiments, the flue gas 18 may be directed along multiple and/or separate flow paths 42, 44 with at least one of the paths 42 leading to the heat exchanger 16 and another path 44 leading to the duct 34 of the HRSG 12.

The combustion chamber 20 produces/generates the flue gas 18. In embodiments, the combustion chamber 20 may produce the flue gas 18 via combusting a fuel. It is to be understood, however, that the combustion chamber 20 may produce the flue gas 18 by other chemical processes, e.g., electrolysis and/or other chemical means of producing a heated gas. In embodiments, the combustion chamber 20 may provide heat for a process, e.g., power generation, substance conditioning, and/or other industrial, medical and/or domestic applications, in addition to providing the flue gas 18 for heating the transferring medium 22. In such embodiments, the flue gas 18 may be a waste gas. For example, the combustion chamber 20 may provide heat for a generator and/or other industrial process. By using the flue gas 18 of a combustion chamber 20 which serves a purpose other than simply providing flue gas 18 and/or heat for heating the transferring medium 22, via the heat exchanger 16, the system 10 increases the over all efficiency of the HRSG 12. The efficiency of the HRSG 12 is especially increased when the flue gas 18 is the heat-containing medium 28 from which the HRSG 12 recovers thermal energy.

Figure 2:
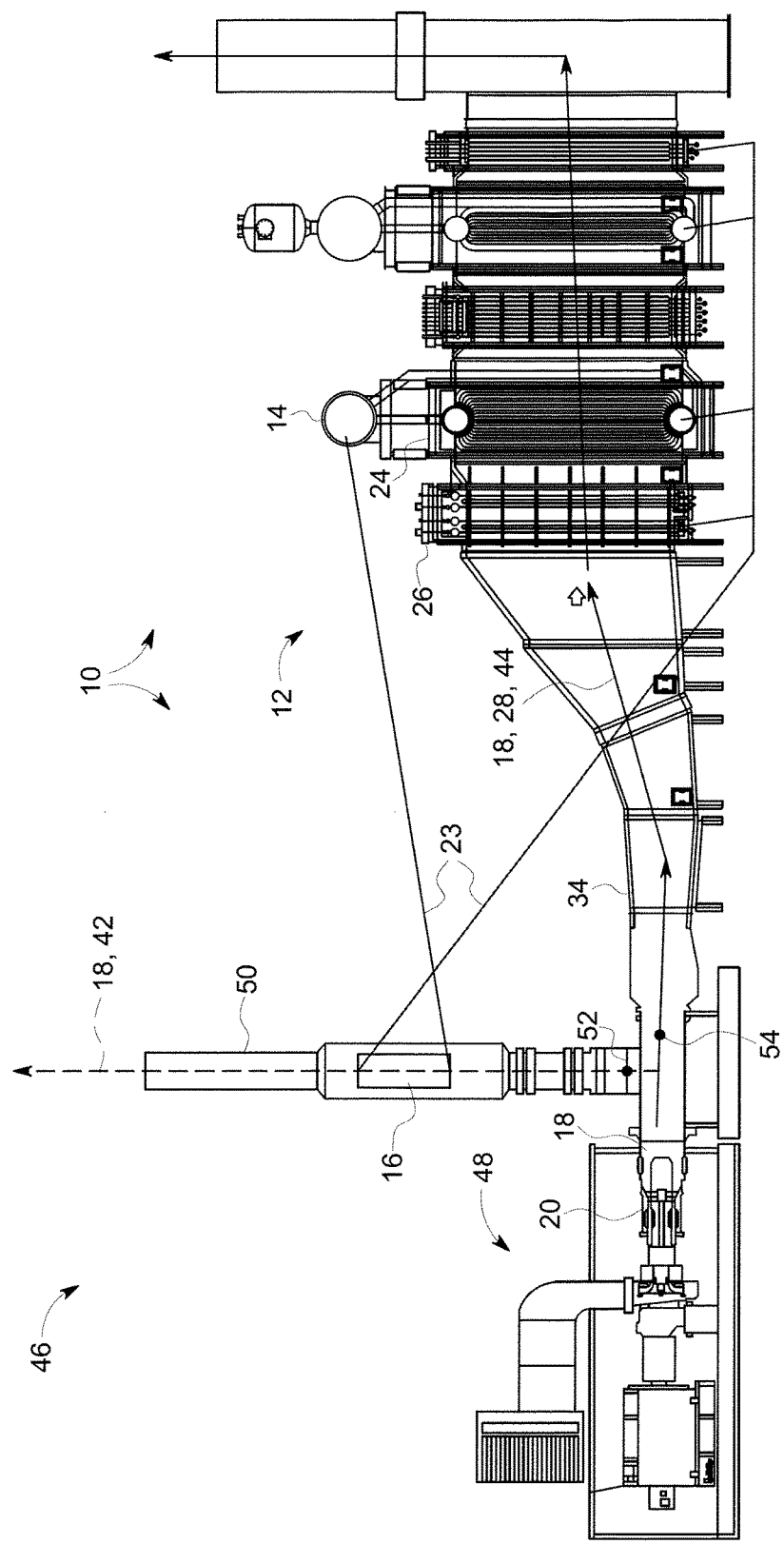
FIG. 2 is another diagram of the system of FIG. 1, wherein the heat recovery steam generator is a secondary generator of a combined cycle power generation plant.

For example, as illustrated in FIG. 2, the HRSG 12 may be a secondary generator of a combined cycle power generation plant 46. In such embodiments, the combustion chamber 20 may produce heat and/or power for a primary generator 48 of the combined cycle power generation plant 46, e.g., the combustion chamber 20 may be a gas-fired turbine 48 that generates electrical power, and the HRSG 12 may be configured to increase the overall efficiency of the combined cycle power generation plant 46 by capturing some and/or most of the thermal energy in the flue gas 18 produced by the gas-fired turbine 48.

In embodiments, the combined cycle power generation plant 46 may operate in two modes: simple-cycle mode (shown in FIG. 1) and combined cycle-mode (shown in FIG. 2). In combined-cycle mode, the HRSG 12 is "online" such that the flue gas 18 produced by the combustion chamber 20 is fed via duct 34 into the HRSG 12 which recovers, via the one or more components 14, 24, 26, some and/or most of the thermal energy contained in the flue gas 18, i.e., the flue gas 18 is the heat-containing medium 28. In simple-cycle mode, the HRSG 12 is "offline" and does not recover thermal energy, via the one or more components 14, 24, 26, from the flue gas 18, i.e., the flue gas 18 remains the heat-containing medium 28 but the evaporator 24 and superheater 26 are not used to generate steam.

In such embodiments, when the combined cycle power generation plant 46 is in simple-cycle mode, however, the flue gas 18 may be diverted away from the one or more components 14, 24, 26 of the HRSG 12 so that the one or more components 14, 24, 26 are not exposed to the flue gas 18, i.e., in simple-cycle mode, the flue gas 18 follows solid line/path 42, as opposed to dashed line/path 44, as shown in FIG. 1; and in combined-cycle mode, the flue gas 18 follows the solid line/path 44, as opposed to the dashed line/path 42, as shown in FIG. 2. In such embodiments, the combined cycle power generation plant 46 may include a bypass stack 50 that forms part of the flow path 42 and allows the flue gas 18 to bypass, i.e., flow around, the HRSG 12. In embodiments where the combined cycle power generation plant 46 has a bypass stack 50, one or more valves (52, 54 in FIG. 2) may alter the flow of the flue gas 18 such that the flue gas 18 flows through the bypass stack 50 in the simple-cycle mode, but does not flow through the bypass stack 50 in the combined-cycle mode. As is to be appreciated, the valves 52, 54 may be variable, i.e., the amount of flue gas 18 diverted into the bypass stack 50 versus the amount of flue gas 18/heat-containing medium 28 sent to the HRSG 12 may be varied, and/or digital, i.e., valves 52, 54 may only direct all of the flue gas 18 to either the bypass stack 50 or to the HRSG 12.

Figure 3:
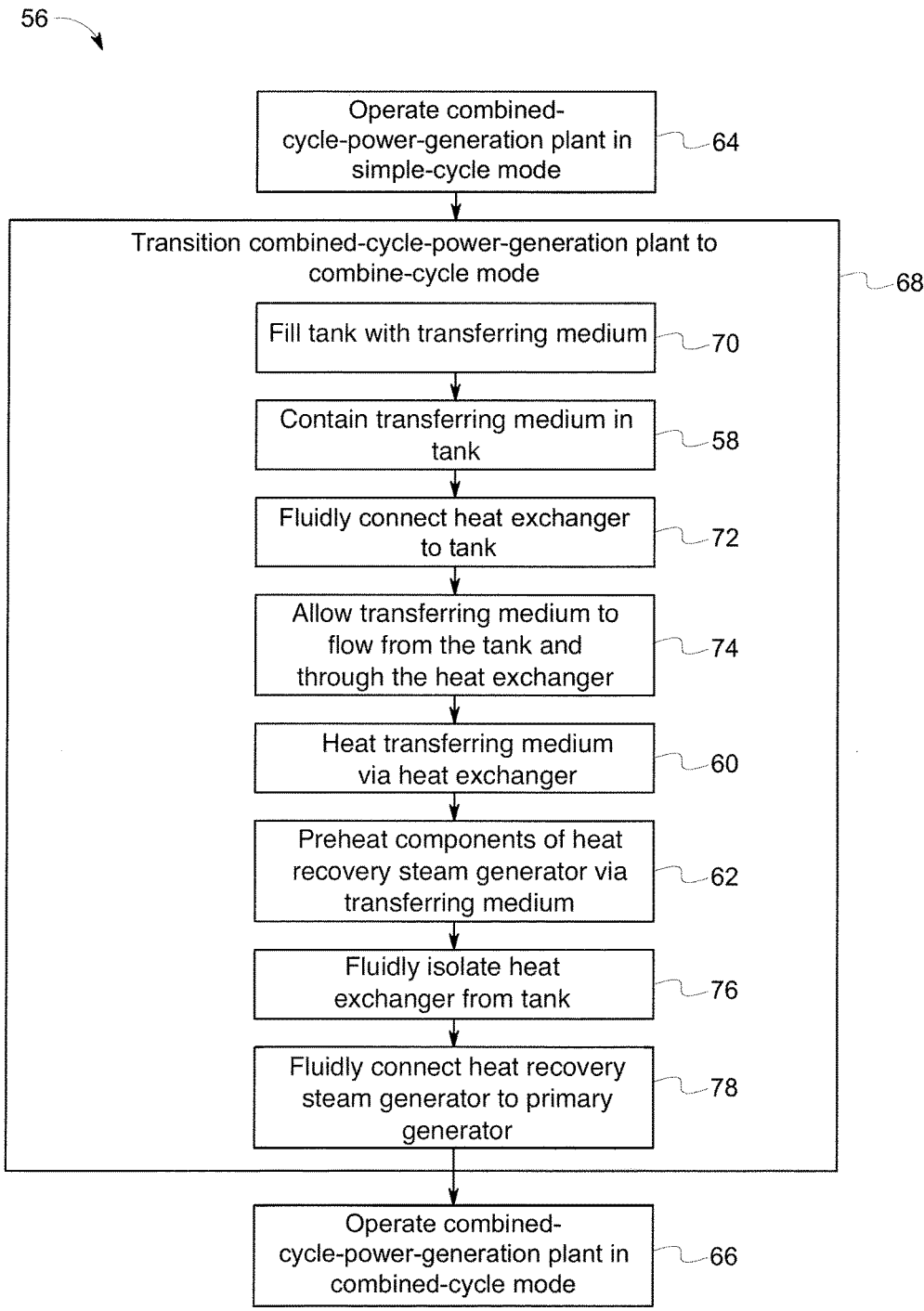
FIG. 3 is a flowchart depicting a method for preheating a heat recovery steam generator utilizing the system of FIG. 1 according to an embodiment of the invention.

Referring now to FIG. 3, a method 56 for preheating the HRSG 12, via the system 10, is shown. As is to be appreciated, in embodiments, the preheating application stored in the memory device 33 may be loaded into the at least one processor/CPU 32 such that the controller 30 is adapted by the preheating application to perform all, or part, of method 56. As can be seen in FIG. 3, the method 56 includes containing 58 the transferring medium 22 in the tank 14; heating 60 the transferring medium 22 via the heat exchanger 16; and preheating 62 the one or more components 14, 24, 26 of the HRSG 12 via the transferring medium 22 before the one or more components 14, 24, 26 are exposed to the heat-containing medium 28 from which the HRSG 12 recovers thermal energy.

As discussed above, the HRSG 12 may be the secondary generator of a combined cycle power generation plant 46. In such embodiments, the method 56 may further include operating 64 the combined cycle power generation plant 46 in a simple-cycle mode, and operating 66 the combined cycle power generation plant 46 in a combined-cycle mode. In other embodiments, the method 56 may further include transitioning 68 the combined cycle power generation plant 46 from the simple-cycle mode to the combined-cycle mode. In such embodiments, transitioning 68 the combined cycle power generation plant 46 from the simple-cycle mode to the combined-cycle mode may include filling 70 the tank 14 with the transferring medium 22; containing 58 the transferring medium 22 in the tank 14; fluidly connecting 72 the heat exchanger 16 to the tank 14; allowing 74 the transferring medium 22 to flow from the tank 14 and through the heat exchanger 16; heating 60 the transferring medium 22 via the heat exchanger 16; preheating 62 the one or more components 14, 24, 26 of the HRSG 12 via the transferring medium 22 before the one or more components 14, 24, 26 are exposed to the heat-containing medium 28 from which the HRSG 12 recovers thermal energy; fluidly isolating 76 the heat exchanger 16 from the tank 14; and/or fluidly connecting 78 the HRSG 12 to the primary generator 48, i.e., feeding the flue gas 18 produced by the combustion chamber 20 of the primary generator 48 to the HRSG 12 for heat-recovery operations/steam production.

Accordingly, in an embodiment, the combined cycle power generation plant 46 may initially begin operating 64 in simple-cycle mode with valves 52, 54 directing/diverting the flue gas 18/heat-containing medium 28 away from the one or more components 14, 24, 26 of the HRSG 12 via the bypass stack 50. As such, the temperature of the one or more components 14, 24, 26 may be lower than the temperature of flue gas 18/heat-containing medium 28 produced by the primary generator 48. The combined cycle power generation plant 46 may then begin transitioning 68 to the combine-cycle mode by filling 70 the tank 14 with the transferring medium 22, e.g., drum water, such that the tank 14 contains 58 the transferring medium 22. While some embodiments disclosed herein include filling 70 the tank 14 during the transition 68 from simple-cycle to combined-cycle, it is to be understood that the tank 14 may be filled with transferring medium 22 well before the transition 68 begins and/or before the primary generator 48 begins producing flue gas 18.

Once the tank 14 has been filled 70, the heat exchanger 16 is then fluidly connected 72 to the tank 14 so that the transferring medium 22 is allowed 74 to flow through the heat exchanger 16. As the transferring medium 22 flows through the heat exchanger 16, it is heated 60/increases in temperature by absorbing thermal energy from the flue gas 18. The transferring medium 22 is then circulated through the components 14, 24, 26 such that the components 14, 24, 26 are preheated 62/tempered. In embodiments, preheating 62/tempering the components 14, 24, 26 reduces the amount/magnitude of thermal stress induced in the components 14, 24, 26 by exposure to the heat-containing medium 28. As will be appreciated, heating 60 the transferring medium 22 and preheating 62 the one or more components 14, 24, 26 may occur at the same time. For example, in embodiments, the transferring medium 22 may be cycled through the tank 14, heat exchanger 16, evaporator 24, superheater 26, and/or other components of the HRSG 12 multiple times until the transferring medium 22 has transferred enough thermal energy from the flue gas 18 to the components 14, 24, 26 such that the components 14, 24, 26 have reached a desired temperature, i.e., the temperature at which the risk of damage due to thermal stress induced in the components 14, 24, 26 by exposure to the heat-containing medium 28 is within an acceptable/reduced range/amount.

Once the components 14, 24, 26 have been sufficiently tempered/preheated 62 by the transferring medium 22, the heat exchanger 16 may be fluidly isolated 76 from the tank 14. In embodiments, fluidly isolating 76 the heat exchanger 16 from the tank 14 may result in the heat exchanger 16 running dry, i.e., all the transferring medium 22 has been removed from the heat exchanger 16. After fluid isolation 76 of the heat exchanger 16, the HRSG 12 is fluidly connected 78 and/or reconnected to the primary generator 48 thereby exposing the components 14, 24, 26 to the flue gas 18/heat-containing medium 28. Once this occurs, the HRSG 12 is brought online and the combined cycle power generation plant 46 begins operating 66 in the combined-cycle mode.

It is also to be understood that the system 10 may include the necessary electronics, software, memory, storage, databases, firmware, logic/state machines, microprocessors, communication links, displays or other visual or audio user interfaces, printing devices, and any other input/output interfaces to perform the functions described herein and/or to achieve the results described herein. For example, as previously mentioned, the system 10 may include at least one processor 32, and system memory 33, which may include random access memory (RAM) and read-only memory (ROM). The system 10 may further include an input/output controller, and one or more data storage structures. All of these latter elements may be in communication with the at least one processor 32 to facilitate the operation of the system 10 as discussed above. Suitable computer program code may be provided for executing numerous functions, including those discussed above in connection with the system 10 and method 56 disclosed herein. The computer program code may also include program elements such as an operating system, a database management system and "device drivers" that allow the system 10, to interface with computer peripheral devices, e.g., sensors, a video display, a keyboard, a computer mouse, etc.

The at least one processor 32 of the system 10 may include one or more conventional microprocessors and one or more supplementary co-processors such as math co-processors or the like. Elements in communication with each other need not be continually signaling or transmitting to each other. On the contrary, such elements may transmit to each other as necessary, may refrain from exchanging data at certain times, and may cause several steps to be performed to establish a communication link therebetween.

The data storage structures such as memory discussed herein may include an appropriate combination of magnetic, optical and/or semiconductor memory, and may include, for example, RAM, ROM, flash drive, an optical disc such as a compact disc and/or a hard disk or drive. The data storage structures may store, for example, information required by the system 10 and/or one or more programs, e.g., computer program code such as the preheating application and/or other computer program product, adapted to direct the system 10. The programs may be stored, for example, in a compressed, an uncompiled and/or an encrypted format, and may include computer program code. The instructions of the computer program code may be read into a main memory of a processor from a computer-readable medium. While execution of sequences of instructions in the program causes the processor to perform the process steps described herein, hard-wired circuitry may be used in place of, or in combination with, software instructions for implementation of the processes of the present invention. Thus, embodiments of the present invention are not limited to any specific combination of hardware and software.

The program may also be implemented in programmable hardware devices such as field programmable gate arrays, programmable array logic, programmable logic devices or the like. Programs may also be implemented in software for execution by various types of computer processors. A program of executable code may, for instance, includes one or more physical or logical blocks of computer instructions, which may, for instance, be organized as an object, procedure, process or function. Nevertheless, the executables of an identified program need not be physically located together, but may include separate instructions stored in different locations which, when joined logically together, form the program and achieve the stated purpose for the programs such as preserving privacy by executing the plurality of random operations. In an embodiment, an application of executable code may be a compilation of many instructions, and may even be distributed over several different code partitions or segments, among different programs, and across several devices.

The term "computer-readable medium" as used herein refers to any medium that provides or participates in providing instructions to at least one processor 32 of the system 10 (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, a RAM, a PROM, an EPROM or EEPROM (electronically erasable programmable read-only memory), a FLASH-EEPROM, any other memory chip or cartridge, or any other medium from which a computer can read.

Various forms of computer readable media may be involved in carrying one or more sequences of one or more instructions to at least one processor for execution. For example, the instructions may initially be borne on a magnetic disk of a remote computer (not shown). The remote computer can load the instructions into its dynamic memory and send the instructions over an Ethernet connection, cable line, or telephone line using a modem. A communications device local to a computing device, e.g., a server, can receive the data on the respective communications line and place the data on a system bus for at least one processor. The system bus carries the data to main memory, from which the at least one processor retrieves and executes the instructions. The instructions received by main memory may optionally be stored in memory either before or after execution by the at least one processor. In addition, instructions may be received via a communication port as electrical, electromagnetic or optical signals, which are exemplary forms of wireless communications or data streams that carry various types of information.

It is further to be understood that the above description is intended to be illustrative, and not restrictive. For example, the above-described embodiments (and/or aspects thereof) may be used in combination with each other. Additionally, many modifications may be made to adapt a particular situation or material to the teachings of the invention without departing from its scope.

For example, in an embodiment, a system for preheating a heat recovery steam generator is provided. The system includes a tank and a heat exchanger. The tank contains a transferring medium. The heat exchanger is disposed in a flow path of a flue gas produced by a combustion chamber, and is fluidly connected to the tank such that the transferring medium flows through the heat exchanger and is heated by the flue gas. The transferring medium preheats one or more components of the heat recovery steam generator. In certain embodiments, the transferring medium flows between the tank and the heat exchanger via at least one of natural convection and forced convection. In certain embodiments, the tank is an evaporator drum and the transferring medium is drum water. In certain embodiments, the one or more components of the heat recovery steam generator include one or more pressure parts. In certain embodiments, the one or more pressure parts include at least one of an evaporator and a superheater. In certain embodiments, the heat recovery steam generator is configured to recovery thermal energy from the flue gas after the one or more components have been preheated via the transferring medium. In certain embodiments, the heat recovery steam generator is a secondary generator of a combined cycle power generation plant where the one or more components of the heat recovery steam generator are exposed to the flue gas when the combined cycle power generation plant is in a combined-cycle mode, and where the one or more components of the heat recovery steam generator are not exposed to the flue gas when the combine-cycle-power-generation plant is in a simple-cycle mode. In certain embodiments, when the combined cycle power generation plant is in the simple-cycle mode, a bypass stack forms part of the flow path and allows the flue gas to bypass the heat recovery steam generator, and the heat exchanger is further disposed in the bypass stack. In certain embodiments, the heat exchanger is fluidly isolated from the tank when the combined cycle power generation plant is in the combined-cycle mode.

Other embodiments provide for a method for preheating a heat recovery steam generator. The method includes containing a transferring medium in a tank disposed in the heat recovery steam generator. The method further includes heating the transferring medium via a heat exchanger disposed in a flow path of a flue gas produced by a combustion chamber, the heat exchanger fluidly connected to the tank such that the transferring medium flows through the heat exchanger. The method further includes preheating one or more components of the heat recovery steam generator via the transferring medium. In certain embodiments, the transferring medium flows between the tank and the heat exchanger via at least one of natural convection and forced convection. In certain embodiments, the tank is an evaporator drum and the transferring medium is drum water. In certain embodiments, the one or more components of the heat recovery steam generator include one or more pressure parts. In certain embodiments, the one or more pressure parts include at least one of an evaporator and a superheater. In certain embodiments, the heat recovery steam generator is configured to recovery thermal energy from the flue gas. In certain embodiments, the heat recovery steam generator is a secondary generator of a combined cycle power generation plant. In such embodiments, the method further includes: operating the combined cycle power generation plant in a combined-cycle mode in which the one or more components of the heat recovery steam generator are exposed to the flue gas; and operating the combined cycle power generation plant in a simple-cycle mode in which the one or more components of the heat recovery steam generator are not exposed to the flue gas. In certain embodiments, when the combined cycle power generation plant in the simple-cycle mode, a bypass stack forms part of the flow path and allows the flue gas to bypass the heat recovery steam generator, and the heat exchanger is further disposed in the bypass stack. In certain embodiments, operating the combined cycle power generation plant in the combined-cycle mode includes fluidly isolating the heat exchanger from the tank.

Yet still other embodiments provide for a system for preheating a heat recovery steam generator of a combined cycle power generation plant. The system includes an evaporator drum and a heat exchanger. The evaporator drum is disposed in the heat recovery steam generator and contains drum water. The heat recovery steam generator is configured to recover thermal energy from a flue gas produced by a primary generator of the combined cycle power generation plant when the combined cycle power generation plant is in a combined-cycle mode. The heat exchanger is disposed in a bypass stack of the combined cycle power generation plant and fluidly connected to the evaporator drum. When the combined cycle power generation plant is in a simple-cycle mode, the drum water flows through the heat exchanger, the bypass stack allows the flue gas to bypass the heat recovery steam generator and heat the drum water flowing through the heat exchanger, and one or more pressure parts of the heat recovery steam generator are preheated via the drum water before the one or more pressure parts are exposed to the flue gas when the combined cycle power generation plant is in the combined-cycle mode. In certain embodiments, the heat exchanger is fluidly isolated from the evaporator drum when the combined cycle power generation plant is in the combined-cycle mode.

Accordingly, embodiments of the invention disclosed herein provide many benefits. For example, by preheating the one or more components 14, 24, 26 of a HRSG 12 prior to the components 14, 24, 26 being exposed to the heat-containing medium 28, some embodiments reduce the amount of thermal stress induced in the components 14, 24, 26 when exposed to the heat-containing medium 28.

Accordingly, by reducing the amount of thermal stress induced in the components 14, 24, 26 when exposed to the heat-containing medium 28, some embodiments, may extend the service lives of the one or more components 14, 24, 26. Further, in some embodiments in which the HRSG 12 is the secondary generator of a combined cycle power generation plant 46, preheating the one or more components 14, 24, 26, in accordance with the system 10 and method 56 disclosed herein, may allow for shorter transitions between simple-cycle mode and combined-cycle mode. Additionally, in some embodiments, the heat exchanger 16, and associated conduits/piping 23 to circulate the transferring medium 22, may be made from inexpensive materials. Thus, such embodiments offer a highly economical solution to protecting the one or more components 14, 24, 26 of an HRSG 12 from damage due to thermal stress.

Additionally, while the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format are not intended to be interpreted based on 35 U.S.C. §112(f), unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

What is claimed is:

1. A system for preheating a heat recovery steam generator, the system comprising:
   a tank containing a transferring medium;
   a heat exchanger, disposed in a flow path of a flue gas produced by a combustion chamber, the heat exchanger being fluidly connected to the tank such that the transferring medium flows through the heat exchanger and is heated by the flue gas; and
   wherein the transferring medium heats one or more components of the heat recovery steam generator, via thermal energy absorbed from the flue gas, before the one or more components are directly contacted by the flue gas as part of steam generation operations.

2. The system of claim 1, wherein the transferring medium flows between the tank and the heat exchanger via at least one of natural convection and forced convection.

3. The system of claim 1, wherein the tank is an evaporator drum and the transferring medium is drum water.

4. The system of claim 1, wherein the one or more components of the heat recovery steam generator include one or more pressure parts.

5. The system of claim 4, wherein the one or more pressure parts include at least one of an evaporator and a superheater.

6. The system of claim 1, wherein the heat recovery steam generator is configured to recover thermal energy from the flue gas after the one or more components have been heated via the transferring medium.

7. The system of claim 6, wherein the heat recovery steam generator is a secondary generator of a combined cycle power generation plant where the one or more components of the heat recovery steam generator are exposed to the flue gas when the combined cycle power generation plant is in a combined-cycle mode, and where the one or more components of the heat recovery steam generator are not exposed to the flue gas when the combine-cycle-power-generation plant is in a simple-cycle mode.

8. The system of claim 7, wherein when the combined cycle power generation plant is in the simple-cycle mode, a bypass stack forms part of the flow path and allows the flue gas to bypass the heat recovery steam generator, and the heat exchanger is further disposed in the bypass stack.

9. The system of claim 7, wherein the heat exchanger is fluidly isolated from the tank when the combined cycle power generation plant is in the combined-cycle mode.

10. A method for preheating a heat recovery steam generator, the method comprising:
    containing a transferring medium in a tank disposed in the heat recovery steam generator;
    heating the transferring medium via a heat exchanger disposed in a flow path of a flue gas produced by a combustion chamber, the heat exchanger fluidly connected to the tank such that the transferring medium flows through the heat exchanger; and
    heating one or more components of the heat recovery steam generator, via thermal energy absorbed from the flue gas by the transferring medium, before the one or more components are directly contacted by the flue gas as part of steam generation operations.

11. The method of claim 10, wherein the transferring medium flows between the tank and the heat exchanger via at least one of natural convection and forced convection.

12. The method of claim 10, wherein the tank is an evaporator drum and the transferring medium is drum water.

13. The method of claim 10, wherein the one or more components of the heat recovery steam generator include one or more pressure parts.

14. The method of claim 13, wherein the one or more pressure parts include at least one of an evaporator and a superheater.

15. The method of claim 10, wherein the heat recovery steam generator is configured to recover thermal energy from the flue gas.

16. The method of claim 15, wherein the heat recovery steam generator is a secondary generator of a combined cycle power generation plant, and the method further comprises:
operating the combined cycle power generation plant in a combined-cycle mode in which the one or more components of the heat recovery steam generator are exposed to the flue gas; and
operating the combined cycle power generation plant in a simple-cycle mode in which the one or more components of the heat recovery steam generator are not exposed to the flue gas.

17. The method of claim 16, wherein when the combined cycle power generation plant is in the simple-cycle mode, a bypass stack forms part of the flow path and allows the flue gas to bypass the heat recovery steam generator, and the heat exchanger is further disposed in the bypass stack.

18. The method of claim 16, wherein, operating the combined cycle power generation plant in the combined-cycle mode comprises:
fluidly isolating the heat exchanger from the tank.

19. A system for preheating a heat recovery steam generator of a combined cycle power generation plant, the system comprising:
an evaporator drum, disposed in the heat recovery steam generator, containing drum water, the heat recovery steam generator configured to recover thermal energy from a flue gas produced by a primary generator of the combined cycle power generation plant when the combined cycle power generation plant is in a combined-cycle mode;
a heat exchanger, disposed in a bypass stack of the combined cycle power generation plant, fluidly connected to the evaporator drum; and
wherein when the combined cycle power generation plant is in a simple-cycle mode, the drum water flows through the heat exchanger, the bypass stack allows the flue gas to bypass the heat recovery steam generator and heat the drum water flowing through the heat exchanger, and one or more pressure parts of the heat recovery steam generator are preheated via the drum water before the one or more pressure parts are exposed to the flue gas when the combined cycle power generation plant is in the combined-cycle mode.

20. The system of claim 19, wherein the heat exchanger is fluidly isolated from the evaporator drum when the combined cycle power generation plant is in the combined-cycle mode.

21. A system for preheating a heat recovery steam generator, the system comprising:
a tank containing a transferring medium;
a heat exchanger, disposed in a flow path of a flue gas produced by a combustion chamber, the heat exchanger being fluidly connected to the tank such that the transferring medium flows through the heat exchanger and is heated by the flue gas; and
wherein the transferring medium preheats one or more components of the heat recovery steam generator,
the heat recovery steam generator is configured to recovery thermal energy from the flue gas after the one or more components have been preheated via the transferring medium,
the heat recovery steam generator is a secondary generator of a combined cycle power generation plant where the one or more components of the heat recovery steam generator are exposed to the flue gas when the combined cycle power generation plant is in a combined-cycle mode, and where the one or more components of the heat recovery steam generator are not exposed to the flue gas when the combine-cycle-power-generation plant is in a simple-cycle mode, and
when the combined cycle power generation plant is in the simple-cycle mode, a bypass stack forms part of the flow path and allows the flue gas to bypass the heat recovery steam generator, and the heat exchanger is further disposed in the bypass stack.

22. A method for preheating a heat recovery steam generator, the method comprising:
containing a transferring medium in a tank disposed in the heat recovery steam generator, the heat recovery steam generator being a secondary generator of a combined cycle power generation plant and configured to recovery thermal energy from a flue gas produced by a combustion chamber;
operating the combined cycle power generation plant in a simple-cycle mode in which one or more components of the heat recovery steam generator are not exposed to the flue gas;
heating the transferring medium via a heat exchanger disposed in a flow path of the flue gas, the heat exchanger fluidly connected to the tank such that the transferring medium flows through the heat exchanger;
preheating the one or more components of the heat recovery steam generator via the transferring medium;
operating the combined cycle power generation plant in a combined-cycle mode in which the one or more components of the heat recovery steam generator are exposed to the flue gas; and
wherein when the combined cycle power generation plant is in the simple-cycle mode, a bypass stack forms part of the flow path and allows the flue gas to bypass the heat recovery steam generator, and the heat exchanger is further disposed in the bypass stack.

* * * * *